Patented Dec. 22, 1931

1,837,772

UNITED STATES PATENT OFFICE

ANTHONY JAMES HAILWOOD AND ARNOLD SHEPHERDSON, OF BLACKLEY, MANCHESTER, ENGLAND, ASSIGNORS TO BRITISH DYESTUFFS CORPORATION LIMITED, OF BLACKLEY, MANCHESTER, ENGLAND

PROCESS FOR THE PREPARATION OF SOLID BODIES IN FINELY DIVIDED STATES

No Drawing. Application filed April, 9, 1928, Serial No. 268,796, and in Great Britain April 11, 1927.

For the efficient working of many modern chemical and other processes, it is often essential that the solid bodies used therein be very finely divided. Thus pigment colours and rubber fillers may be instanced as cases where sub-division, even to ultramicroscopic dimensions, offers valuable results not obtainable with coarser materials.

Considerable attention has been given to obtaining improved means for the sub-division of substances and has been recently directed to the perfection of high speed mills, which consist essentially of two or more surfaces in exceedingly rapid relative motion and which are very close to each other. The material to be divided is passed between these moving surfaces in suitable liquid suspension and presumably the liquid used plays a large part in the sub-division. In general, to obtain technically valuable sub-division with such an apparatus, very high speeds—amounting in some cases to 12,000 revolutions per minute of a 5-inch diameter rotor—have to be used. This limits the size and output of the mill, and reduced efficiency also results from the extremely short duration of the passage of individual particles through the mill. A still further disadvantage lies in the high power costs necessary to obtain the desired high speeds.

By our invention these disadvantages can be overcome in a simple and technically valuable manner. We have carried out a number of experiments and have arrived at the very surprising result that by merely stirring a quantity of the roughly ground product to be finely divided or dispersed, together with a liquid and a relatively large amount of a finely divided or powdered solid comminutor of a greater degree of hardness than the product to be sub-divided, sub-division proceeds very rapidly and extremely fine final sub-division is possible.

The amount and nature of the liquid taken as dispersing or grinding medium may be varied but usually the mixture during agitation should be of a somewhat thick and viscous consistency.

By the term "powdered solid comminutor", we mean a powdered solid having a greater degree of hardness than the material to be finely divided or dispersed and which is insoluble in the liquid used during the sub-division process. Some of the material which we may use as a powdered solid comminutor are powdered iron, zinc, copper, sand or silica.

The fineness of division of this component of the mixture is however an important factor. Sub-division of the desired product proceeds more rapidly when the comminutor is itself very finely divided or powdered.

Further we have found that the rate of sub-division is usually accelerated by the addition of one or more dispersing agents or colloidal substances soluble in the liquid used. As an example of a suitable colloidal substance particularly suitable for addition when water is the medium of dispersion, we may mention the product which may be obtained by the moderated oxidation of sulphite cellulose pitch with nitric acid as described in co-pending application Serial No. 218,569. Although by our new process solids may be easily reduced to particles of ultramicroscopic dimensions, it is also applicable to cases where the state of sub-division required is not so fine.

The degree of sub-division may be controlled by variation of the time of mixing, the size of particle of the comminutor, the amount of liquid added and the amount and nature of the added colloids. Further, the rate of sub-division may be affected by increasing the speed of stirring, though it is a remarkable feature of our invention that comparatively slow agitation will produce efficient sub-division in quite a short time. Further, our invention is not confined to mixing or stirring the mixture in any particular type of vessel, or mill. We may, for example, use a rotating vessel with or without baffles, or a stationary vessel positively stirred by a revolving agitator. Alternatively, we may cause the mixture to flow through pipes or over surfaces. If desired, the apparatus used may be designed to work in a continuous manner. Although as mentioned already the comminutor may consist of any finely divided solid of a suitable degree of hardness, there is in many cases a particular advantage in using iron or other magnetic substances, because the comminutor is then easily removed by the application of a suitable magnetic field to the resulting mixture. Separation by means of a centrifuge is also convenient in many instances.

As is well known, the addition of large quantities of insoluble powders to a colloid dispersion will often materially increase the rate of settling of the dispersed material, probably by entrainment. It is a matter of experience that this effect is most marked with concentrated dispersions, and under the same conditions the rate of settling of the insoluble powder is slow. It follows, therefore, that for the purpose of separating the comminutor, it is desirable to dilute largely. The diluted dispersion may, after removal of the comminutor by decantation or otherwise, be evaporated to the desired concentration, or in the presence of suitable protective colloids such as sulphite cellulose waste liquor, benzyl sulphonic acid, to dryness (compare, e. g. British Patent No. 29583 of 1912). Alternatively, the diluted dispersion may be flocculated by addition of an electrolyte, especially a mineral acid in the case of aqueous dispersions; repeptization of the precipitate occurs on removal of the electrolyte or neutralization of the acid. Finally, it is advantageous to choose as the protective colloid during comminution a precipitable dispersing agent, such as sodium lysalbinate, or an alkaline solution of the amidated sulphite cellulose pitch described in co-pending application Serial No. 222,212 and which can be obtained by the action of ammonia under pressure and at a raised temperature on sulphite cellulose pitch. When these or similar substances are used acidification of the diluted dispersion causes precipitation of the protective colloid and the dispersed material together in easily filterable form, and from this precipitate stable, concentrated dispersions are made by simply neutralizing the acid present by addition of alkalies.

A further advantage of separations by means of mineral acid is the removal of the last traces of acid-soluble comminutor or other material.

The following are examples of some methods of carrying out our invention, but these are to be regarded as illustrative and in no sense limitative. In all the examples the substance is first roughly powdered so that most of it passes through a 60-mesh sieve but is stopped by a 120-mesh sieve.

*Example 1.*—10 parts of indigo are mixed with 70 parts of iron dust and 25 parts of a 10 per cent aqueous solution of the dispersing agent which may be obtained by the moderated oxidation of sulphite cellulose pitch with nitric acid as described in our co-pending application Serial No. 218,569 and the mixture is agitated in a suitable vessel until the required degree of dispersion is attained. With an efficient agitator almost complete sub-division to ultramicroscopic size may be obtained in one quarter of an hour with a speed of rotation of 100 revolutions per minute. The iron dust used in this example passed readily and completely through a wire sieve of 120 wires to the inch. When sub-division is of the required type the whole is diluted with 25 parts of water, the iron allowed to settle and the indigo paste decanted. The iron remaining in it may be removed either by further settling or by means of a magnet.

*Example 2.*—Here 70 parts of zinc powder are substituted for the iron in Example 1, when the procedure is the same, except that the separation of the zinc is entirely by settling.

*Example 3.*—Here 70 parts of copper bronze powder are substituted for the zinc in Example 2, when the procedure is the same.

*Example 4.*—Here 70 parts of washed dry sand, sieved through a sieve of 120 mesh is substituted for the zinc in Example 2.

*Example 5.*—10 parts of indanthrone powder are mixed with 70 parts of iron dust which passes through a 90 mesh sieve but not through a 120 mesh, a solution of 2½ parts sulphite cellulose pitch dissolved in 25 parts of water are added and the whole agitated until the required degree of dispersion is attained. After which the working up is as in Example 1.

*Example 6.*—10 parts of 1-amino-2-methyl-anthraquinone are mixed with 70 parts of sand which passes readily through a sieve of 120 mesh. 25 parts of a 10 per cent solution of the dispersing agent described in British Patent No. 224,077, that is to say with naphthalene formaldehyde sulphuric acid condensation products, are added and the whole suitably agitated until the required degree of dispersion is obtained. The working up process proceeds by settling out the sand from the supernatant 1-amino-2-methylanthra-quinone suspension.

*Example 7.*—10 parts of a black wood charcoal are mixed with 70 parts of iron dust of the type mentioned in Example 1. 25 parts of a 10% solution of the dispersing agent which may be obtained by the moderated oxidation of sulphite cellulose pitch with nitric acid as described in our co-pending application Serial No. 218,569 are added and the whole agitated until the required degree of dispersion is obtained. The product may be worked up as in Example 1.

*Example 8.*—5 parts of acetyl cellulose are treated in a mixer with 40 parts of acetone until the product is visibly homogeneous. An addition of 70 parts of iron dust and 10 parts of indanthrone powder is then made and the whole agitated until the required degree of dispersion is achieved. With a peripheral velocity of 8 feet per second in an efficient mixer agitation for half an hour produces a very high degree of dispersion of the indanthrone, a large proportion of it being reduced to an ultramicroscopic condition. The iron may be removed by simple settling from the mass to which more acetone has been added to reduce viscosity. If desired, the iron may be removed wholly or in part by means of a magnetic field.

*Example 9.*—2½ parts of resin are dissolved in 35 parts of methylated spirit and 70 parts of iron dust and 10 parts of indigo added. The procedure is then as in Example 8 diluting with methylated spirit, if convenient, before separating the iron.

*Example 10.*—5 parts of acetyl cellulose are agitated to homogeneity with 40 parts of acetone and a mixture of 10 parts pyranthrone and 70 parts copper powder added. After agitation for half an hour with a peripheral velocity of 8 feet per second, the pyranthrone is reduced to a very fine state of division, very few particles exceeding $2\mu$ in diameter.

The mass may be worked up in various ways. For example, a further quantity of 100 parts of acetone may be added and the product after mixing, allowed to settle. Whereupon the denser and comparatively large copper particles settle whilst the much less dense and comparatively small particles of dispersed pyranthrone remain in suspension and may be decanted.

*Example 11.*—5 parts of pyranthrone are agitated with 40 parts of copper powder and 2½ parts of rubber dissolved in 15 parts of benzene. After the required degree of dispersion has been attained the mass is diluted and the copper separated by decantation.

*Example 12.*—5 parts of pyranthrone are agitated with 35 parts of copper powder and 15 parts of castor oil. Dispersion rapidly ensues. When this has proceeded to the desired extent the product, which makes an excellent material for producing imitation gold effects in lacquers, may be used for such a purpose. Alternatively, the copper may be separated by centrifuging.

*Example 13.*—50 parts of indanthrone powder are stirred with 15 parts of an 11% aqueous solution of amidated sulphite cellulose pitch (application Serial No. 222,212), and which can be obtained by the action of ammonia under pressure and at a raised temperature on sulphite cellulose pitch, 350 parts of sand, and 70 parts of water, until dispersion is complete. The product is then washed by decantation with four separate lots of water, each 750 parts and the combined washings are acidified with hydrochloric acid to 1% acidity. The precipitate is filtered off, washed with water, and made faintly alkaline with caustic soda.

What we claim and desire to secure by Letters Patent is:—

1. A process for increasing the fineness of division of powdered solids which consists in bringing about relative motion between the respective particles in a mixture comprising the powdered solid, a liquid, and a powdered solid comminutor, which is an insoluble solid in the form of a stirrable powder, the comminutor being of harder material than the powdered solid which is to be brought into a finer state of division.

2. A process according to claim 1, in which the comminutor is subsequently removed from the finely divided solid.

3. A process according to claim 1, in which the powdered solid is converted into a highly dispersed solid.

4. A process according to claim 1, in which the liquid medium is water.

5. A process according to claim 1, in which a protective colloid is added to the mixture.

6. A process according to claim 1, in which a dispersing agent is added to the mixture.

7. A process according to claim 1, in which the liquid medium is water and in which a protective colloid precipitable by electrolytes is added to the mixture.

8. A process according to claim 1, in which the liquid medium is water and in which a dispersing agent precipitable by electrolytes is added to the mixture.

9. A process according to claim 1, in which the liquid medium is water and in which a protective colloid precipitable by acids is added, the mixture being diluted with water after comminution, the comminutor being removed by filtration or decantation, and the aqueous dispersion acidified, the resulting precipitate being collected and the acid present in it neutralized, substantially as described.

10. A process according to claim 1, in which the liquid medium is water and in which a dispersing agent precipitable by acids is added, the mixture being diluted with water after comminution, the comminutor being removed by filtration or decantation, and the aqueous dispersion acidified, the resulting precipitate being collected and the acid present in it neutralized, substantially as described.

11. A process as claimed in claim 1, in which the comminutor is sand.

In testimony whereof we affix our signatures.

ANTHONY JAMES HAILWOOD.
ARNOLD SHEPHERDSON.